UNITED STATES PATENT OFFICE.

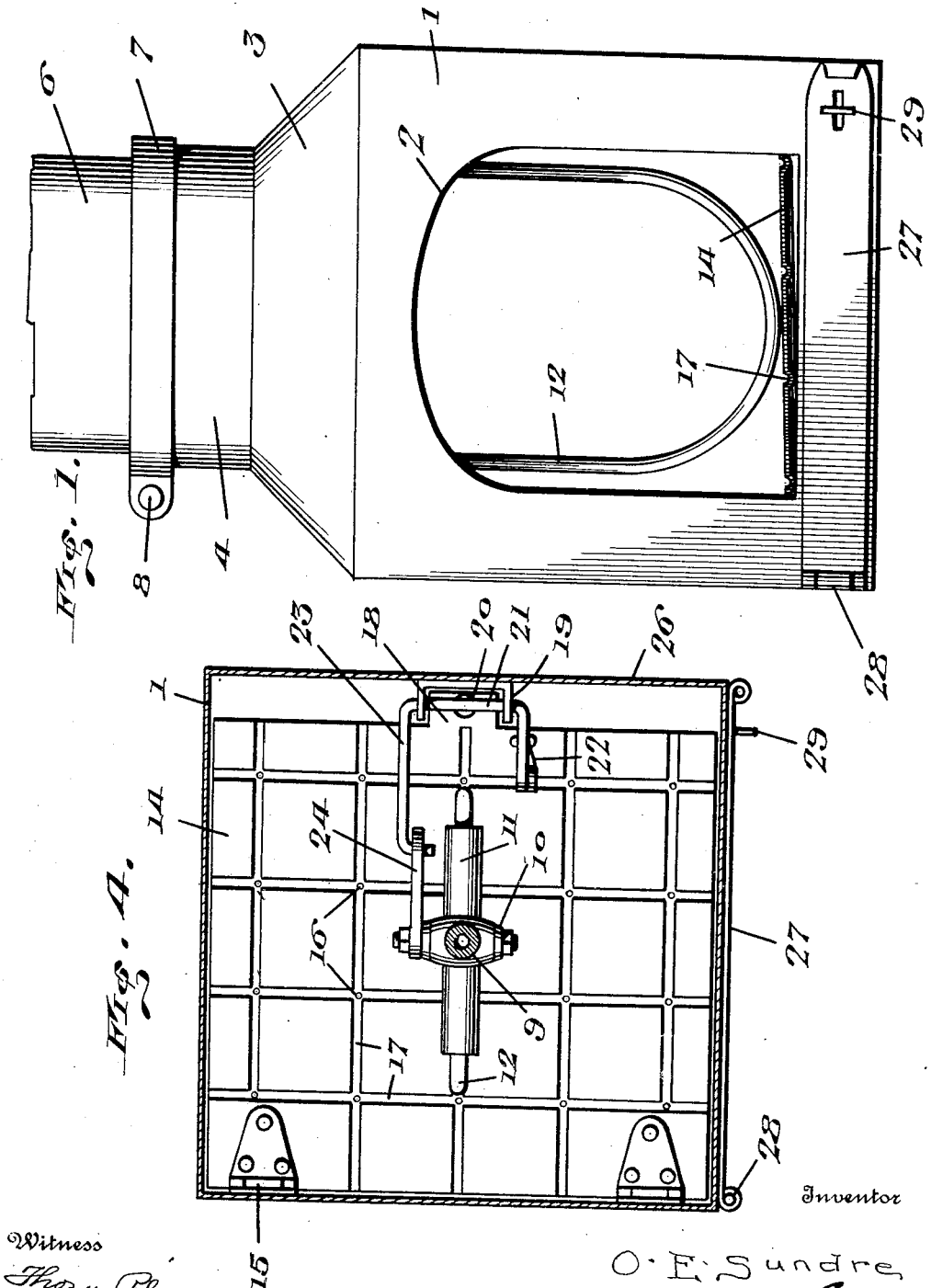

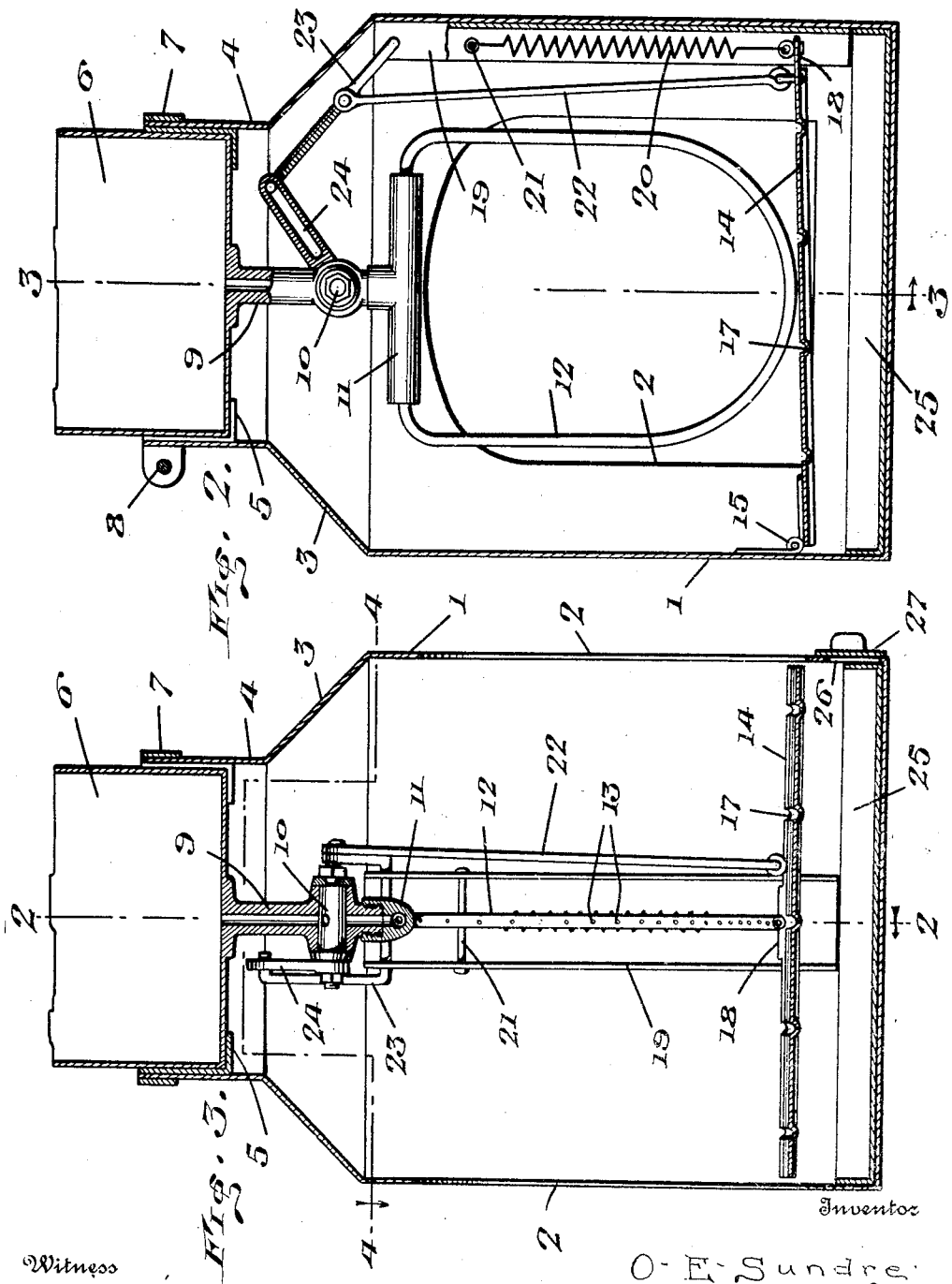

OLAF E. SUNDRE, OF ARLINGTON, MINNESOTA.

AUTOMATIC POULTRY-SPRAYER.

1,342,776.  Specification of Letters Patent.  Patented June 8, 1920.

Application filed June 27, 1919. Serial No. 307,178.

*To all whom it may concern:*

Be it known that I, OLAF E. SUNDRE, a citizen of the United States, residing at Arlington, in the county of Sibley and State of Minnesota, have invented certain new and useful Improvements in Automatic Poultry-Sprayers; and I do hereby declare the following to be a full, clear, and exact description of the invention, such as will enable others skilled in the art to which it appertains to make and use the same.

The present invention relates to an automatic poultry sprayer, and aims to provide a novel and improved device for spraying poultry or other stock.

It is the object of the invention to provide such a device constructed and arranged for the passage of chickens therethrough, and operable to automatically spray a suitable solution against the fowl passing through the device for the purpose of killing vermin.

A further object is the provision of an automatic poultry sprayer having novel and improved features of construction to render the same thoroughly practical and efficient in use.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the sprayer, the upper portion of the tank being broken away.

Fig. 2 is a vertical section taken on the line 2—2 of Fig. 3.

Fig. 3 is a vertical section taken on the line 3—3 of Fig. 2.

Fig. 4 is a horizontal section taken on the line 4—4 of Fig. 3.

The casing 1 may be of metal or other suitable material, and is provided at opposite sides with door ways or openings 2 for the passage of the poultry, it being preferable to place the device at the entrance and exit of the poultry house so that the chickens are compelled to pass through the sprayer when entering or leaving the poultry house. The upper portion of the casing 1 is contracted as at 3, and formed with a neck 4 in which angular seats 5 are secured for supporting a supply tank 6 for containing the insecticide solution, which is preferably under air pressure. A band or strap 7 embraces the neck 4 and its ends are connected by a bolt 8, for clamping said band around the neck to thereby contract the neck 4 against the tank to tightly hold the tank on the casing. This tank 6 is filled with the solution from time to time, and air pumped in at intervals to keep the solution under the desired pressure.

The spraying outfit is suspended from the bottom of the tank, which has a central depending pipe 9 within the upper portion of the casing, and provided with a shut off valve or spigot 10, and a T-coupling 11 is disposed in a horizontal position between the openings 2 and has its intermediate branch attached to the lower end of the pipe 9. A spray pipe 12 is suspended from the T-coupling 11, said spray pipe being bent into U-shape, and having its ends bent inwardly and engaged within the ends of the coupling 11. This spray pipe is suspended between the openings 2 for the passage of fowl in stepping through the casing and the spray pipe is provided along its inner side with discharge apertures 13 for spraying the solution downwardly, horizontally and upwardly against the fowl, thus applying the solution under pressure into the feathers of the fowl, so as to be thoroughly effective for destroying vermin. The solution is not only forced against the sides and onto the back of the fowl, but is also sprayed upwardly from underneath.

In order to automatically operate the valve 10, a tilting platform or tread board 14 is disposed within the lower portion of the casing for the fowl to tread on in passing through the spray pipe from one opening 2 to the other. This platform 14 is hinged at one edge, as at 15, to one side of the casing, so as to extend between the lower edges of the openings 2. This platform has drain apertures 16 for the solution to pass down through, and the upper surface has grooves 17 leading to said apertures to conduct the solution thereto. The free edge of the platform has an extension 18 working within the slot of a vertical guide 19 secured to that side wall of the casing opposite to the hinges 15, thereby guiding the free edge of the platform for vertical movement and a coiled retractile spring 20 is disposed vertically within the guide 19, and has its lower end secured to the extension 18 and its upper end secured within the guide as at 21, thereby lifting the free edge of the platform and permitting the platform to yield when a fowl steps thereon. A rod or link 20 connected at its lower end to the platform near the extension 18 extends upwardly within the casing and is connected to a lever 23 fulcrumed to the upper end of the guide 19, and said lever engages the slotted arm 24 secured to the valve 10, the arrangement being such that when the platform is depressed, the rod or link 22 will pull the lever 23 downwardly, thereby swinging the arm 24 downwardly to open the valve 10. In this manner, when a fowl steps on the platform in passing through the casing, the valve is opened to establish the flow of the solution into the spray pipe and out of the apertures thereof, thereby thoroughly spraying the fowl. When the fowl leaves the casing, the platform being relieved of the weight, will be raised by the spring 20, thereby returning the valve 10 to closed position and shutting off the flow of the solution. The device is thus rendered automatic, so as to require little or no attention outside of filling the tank 6 occasionally and pumping air into same.

To prevent the solution being wasted, a tray 25 is seated on the bottom of the casing under the platform to catch the drippings, and one side of the casing has an opening 26 through which the tray can be inserted and removed, said opening being normally closed by a door 27 hinged to the casing, as at 28, and held closed by a suitable latch 29.

This device eliminates the task of dipping the poultry by hand in the solution, which is frequently overlooked, and the device will save time, money and worry on the part of the poultry raiser. It will save feed, as it requires more feed for a hen that is continually infected with vermin, and in destroying the parasites, egg production is enhanced, as well as producing a better quality and growth of flesh. Fowls which otherwise die by the ravages of parasites will be saved. The tank 6 can be removed by loosening the band or strap 7, thereby withdrawing the spraying outfit with the tank, the lever 23 having been disengaged from the lever arm 24 of the valve. The coupling 11 and spray pipe 12 can then be detached from the pipe 9 and an ordinary spray nozzle substituted, permitting the tank to be used for spraying the walls of the poultry house, etc., if desired.

Having thus described the invention, what is claimed as new is:—

1. A spraying device embodying a casing having openings for the passage of poultry or other stock, and having an upper neck, a tank removably fitted in said neck, said neck having seats therein for supporting the tank and clamping means for embracing and clamping the tank, a discharge pipe depending from the bottom of said tank within the casing and having a valve and spray pipe removable with the tank when it is removed from said neck.

2. A spraying device embodying a casing, having openings for the passage of poultry or other stock, and having an upper neck, a tank removably seated in said neck, a discharge pipe depending from the tank within the casing and having a valve and spray pipe, said valve having an operating arm, a platform hinged within the casing below said spray pipe, spring means for raising said platform, a lever fulcrumed within the casing above the platform, said lever and arm having an operative detachable connection, and a link connecting said lever and platform for swinging said lever to open the valve when the platform is depressed.

In testimony whereof I have signed my name to this specification in the presence of two subscribing witnesses.

OLAF E. SUNDRE.

Witnesses:
E. L. BAUER,
C. F. MAURER.